United States Patent
Rehbein

(12) 
(10) Patent No.: US 6,270,299 B1
(45) Date of Patent: Aug. 7, 2001

(54) CARRIER SYSTEM FOR SECURING GOODS

(76) Inventor: Andrew C. Rehbein, 2995 Brighton Point Rd. NE., Deerwood, MN (US) 56444

( * ) Notice: Subject to any disclaimer, the term of this patent is extended or adjusted under 35 U.S.C. 154(b) by 0 days.

(21) Appl. No.: 09/589,207

(22) Filed: Jun. 7, 2000

(51) Int. Cl.$^7$ ........................................................ B60P 7/10
(52) U.S. Cl. ................................ 410/41; 410/32; 410/34; 410/35
(58) Field of Search ........................... 410/32, 34, 35, 410/36, 38, 41; 296/3; 224/403, 548, 553, 567; 211/72, 169, 169.1, 198; 206/451, 454

(56) References Cited

U.S. PATENT DOCUMENTS

| | | | |
|---|---|---|---|
| 482,332 | * | 9/1892 | Bemis ..................................... 410/32 |
| 1,745,047 | * | 1/1930 | Romine ................................... 410/38 |
| 3,878,942 | * | 4/1975 | Hansen et al. ...................... 410/34 X |
| 3,939,780 | * | 2/1976 | Bundy ..................................... 410/38 |
| 4,165,827 | | 8/1979 | Bott . |
| 4,174,794 | | 11/1979 | Bott . |
| 4,193,736 | * | 3/1980 | Thomaswick ....................... 410/34 X |
| 4,266,708 | | 5/1981 | Bott . |
| 4,273,485 | * | 6/1981 | Fischer et al. .......................... 410/34 |
| 4,365,919 | * | 12/1982 | Mehki .................................. 410/120 |
| 4,385,856 | * | 5/1983 | O'Neal .................................. 410/34 |
| 4,432,478 | | 2/1984 | Bott . |
| 4,688,976 | * | 8/1987 | Rowley et al. ....................... 410/156 |
| 4,955,771 | | 9/1990 | Bott ....................................... 410/94 |
| 5,114,288 | * | 5/1992 | Langendorf et al. .................. 410/34 |
| 5,148,924 | * | 9/1992 | Mason et al. ...................... 410/32 X |
| 5,209,540 | | 5/1993 | Metler . |
| 6,062,781 | * | 5/2000 | Glaser ................................. 410/100 |

* cited by examiner

Primary Examiner—Stephen T. Gordon
(74) Attorney, Agent, or Firm—Merchant & Gould P.C.

(57) ABSTRACT

A carrier system for securing a load of material during transporting of the load. The carrier system can also be used to store materials. The carrier system includes at least one bracket assembly, generally at least one pair of opposed bracket assemblies. Two pairs of opposed bracket assemblies is a typical carrier system construction. Each bracket assembly has a retaining member, a sill member, and an optional brace member, which are moveable attached to a rail system. The carrier system can be used to secure various materials such as sheets of plywood, drywall, or insulation, lumber, windows, doors, pipes and tubing and the like.

11 Claims, 4 Drawing Sheets

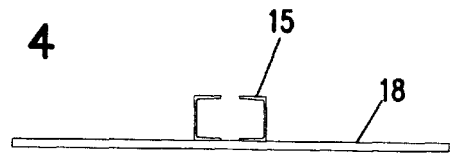
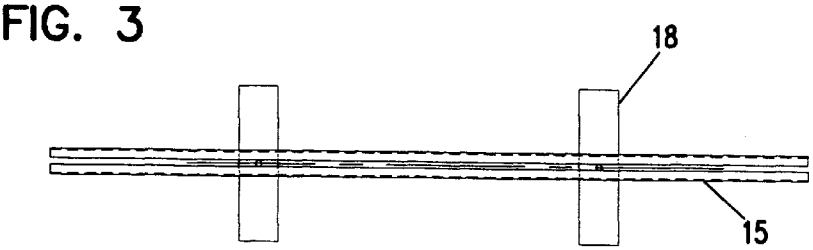
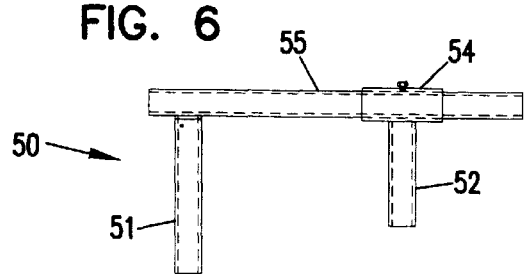
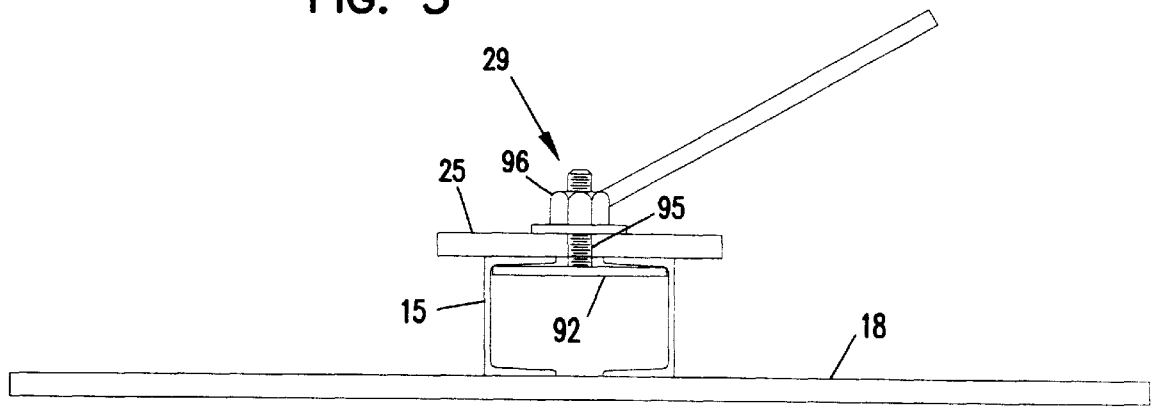

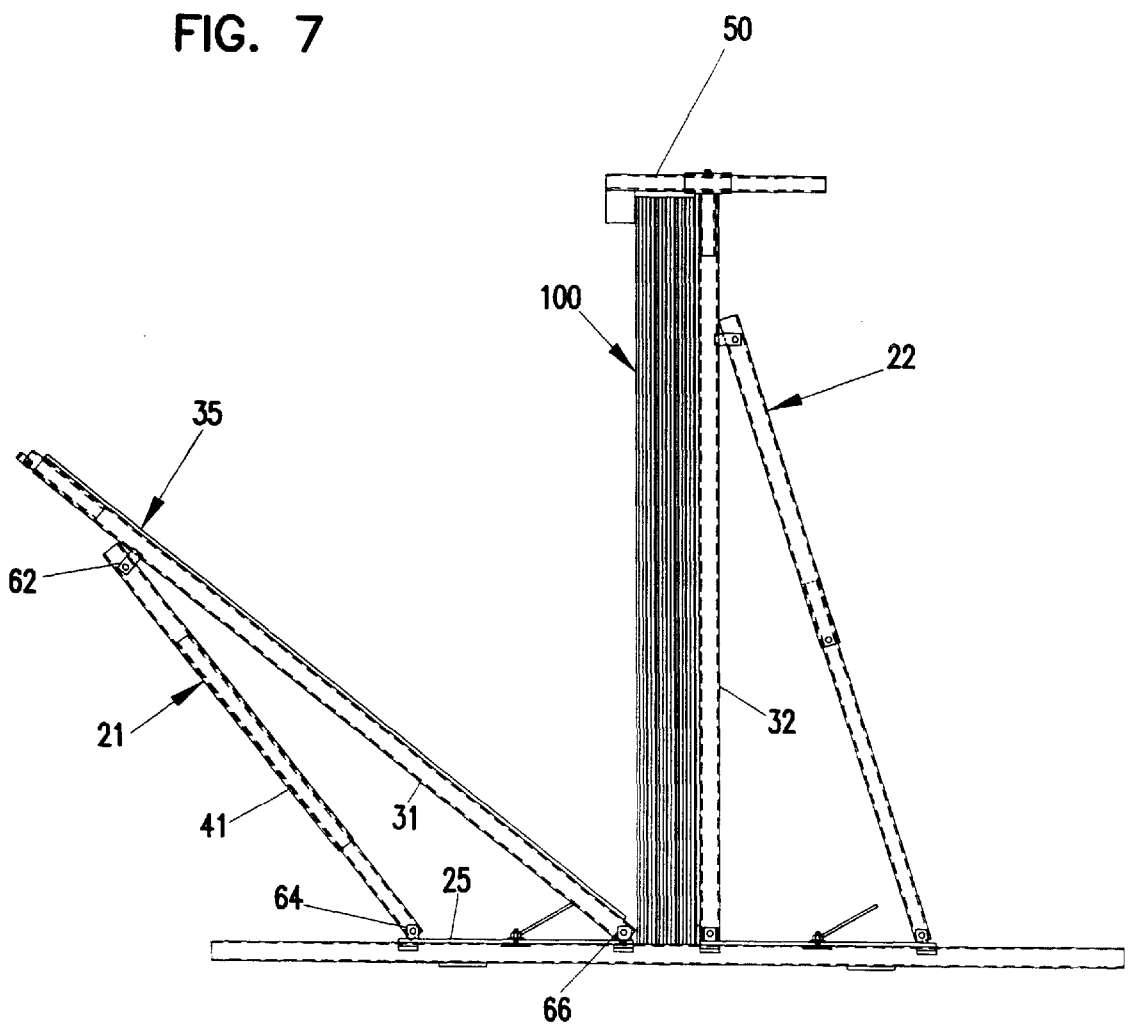

US 6,270,299 B1

CARRIER SYSTEM FOR SECURING GOODS

FIELD OF THE INVENTION

The present invention is directed to a portable carrier system for storing and transporting goods. In particular, the carrier system is directed to transporting and storing sheet-like articles.

BACKGROUND

The typical consumer of construction materials, such as lumber, plywood, and drywall is generally the average homeowner, builder, or remodeler. In most situations, the homeowner is not in a position to transport large quantities of these materials, as these materials are large, long, bulky, or the like. Usually the consumer resorts to having the lumber company or building supply company deliver the materials to the desired site; this transport generally is accomplished by flat bed truck.

As is often the situation, the delivery may include some defective or damaged pieces, be short a few pieces or have a few extra, have the wrong size or type of material, or the consumer may have miscalculated the number of pieces needed for the project. Any of these situations can require the consumer to return to or receive from the lumber yard or building supply company a few or several pieces of material.

Many consumers undertaking the task of a large building or remodeling project have access to a viable transport vehicle for the building materials; typically, the consumer has or can borrow a pick-up truck, trailer, or flat bed truck. In some cases, the only vehicle available is a typical sedan or station wagon. Nevertheless, rather than paying the lumber company or building supply company to haul a few pieces of building material, the consumer uses the transport vehicle available.

Transporting large items, such as plywood, drywall, and even framed windows, is typically done by laying these items flat on the transport surface, such as in the pick-up truck bed. Loading and unloading these material, which is done by sliding the material, can damage the corners and edges of the material. With some materials, the loads are tied down, which can further damage the materials. Also, while the vehicle is moving, the load can shift and slide; this is particularly common when the building materials do not conform to the size of the transport vehicle load area. A shifting load can be dangerous, both to the transport vehicle and to surrounding traffic; the materials may have to be retied or repositioned en route, reloaded differently, and any lost materials would have to be retrieved from the road where they fell. Any or all of these situations lead to lost time and money on the part of the consumer.

For example, a common size for a sheet of drywall or plywood is 4 feet by 8 feet. One common size pick-up truck bed is 4 feet by 6½ feet. In order to transport the building material in the truck bed, the tailgate must be left down or open; this often results in the material sliding out of the bed onto the road during transport. As another example, some building materials can have a size, for example, of 3 feet by 5 feet. When placed in the 4 by 6½ pick-up truck bed, these materials slide around in the bed, damaging edges and corners. Sliding of material can often occur in full-size pick-up beds, which are generally 4 feet by 8 feet.

What is desired is a better mode for transporting large items such as plywood sheets, drywall sheets, and the like.

SUMMARY OF THE INVENTION

The present invention is directed to a carrier system for supporting and securing a load of materials such a sheet goods including plywood, drywall, insulation, and other goods such as lumber, windows, doors, pipes, and the like. The carrier system can be used in a transport vehicle such as a pick-up truck or a trailer, or can be used on a support surface, such as a building site, to secure material.

In one aspect, the invention is directed to a carrier system comprising a lower transverse rail, and a bracket assembly moveably attached to the rail. The bracket assembly has a sill member constructed and adapted for releasable engagement with the first rail, a retaining member pivotally hinged to the sill member; and a brace member connecting the sill member and the retaining member. The retaining member can be pivotally hinged to a first end of the sill member and the brace member can be pivotally hinged to a second opposite end of the sill member.

In another aspect, the carrier system has two bracket assemblies, which are oppositely positioned on the rail, so that the two retaining members are opposed. At least one of these two bracket assemblies may be positionable and repositionable and the rail. In some embodiments, the two bracket assemblies are on a single rail, or, each bracket assembly is on a unique, individual rail. A load of materials is retained between the two retaining members. The load may sit on the rail.

In yet another aspect, the invention is directed to a carrier system having two rails and four bracket assemblies. In particular, the carrier system has a first rail and a second rail parallel to the first rail. A first bracket assembly, a second bracket assembly, a third bracket assembly, and a fourth bracket assembly are present. Each of the bracket assemblies comprises a sill member, a retaining member pivotally hinged to the sill member; and a brace member connecting the sill member and the retaining member. The first bracket assembly and the second bracket assembly are mounted on the first rail, and the third bracket assembly and the fourth bracket assembly are mounted on the second rail; the first bracket assembly and the third bracket assembly are moveably mounted on their respective rails.

In present invention is also directed at methods of loading and unloading material from the carrier system of the present invention.

BRIEF DESCRIPTION OF THE DRAWINGS

FIG. 3 is a top view of the lower rail of the carrier system of FIG. 1;

FIG. 4 is a side view of the lower rail of FIG. 3;

FIG. 5 is an enlarged, side view of the lower rail, similar to that shown in FIG. 3, illustrating a lower fastening device;

FIG. 6 is an enlarged, end view of a securement system for use with the carrier system of the present invention; and FIG. 7 is an end view of the carrier system during loading of a plurality of sheets of building material.

DETAILED DESCRIPTION

The carrier system of the present invention will now be described in reference to the figures. See for example, FIGS. 1 and 2, where carrier system 10 is shown retaining a load of several sheets of building material 100, such as plywood, drywall, polystyrene insulation, or the like. Generally, carrier system 10 includes at least one support bracket assembly 20, but in most embodiments, two opposed support bracket assemblies 20 will be used. In further embodiments, two pairs of opposed support bracket assemblies 20 will be used.

Figure 1:
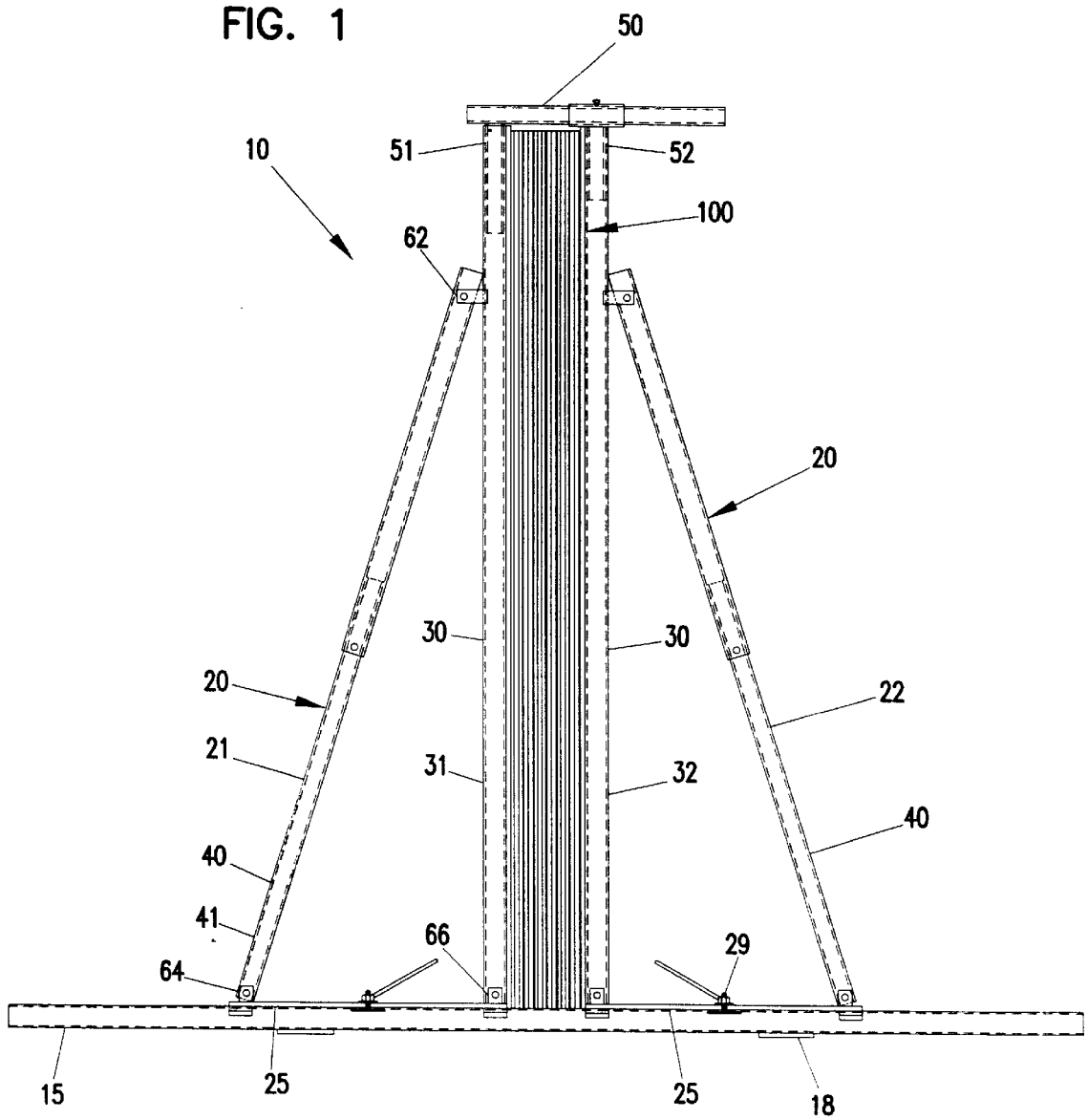
FIG. 1 is an end view of a carrier system according to the present invention having a plurality of sheets of building material held therein.
Figure 2:
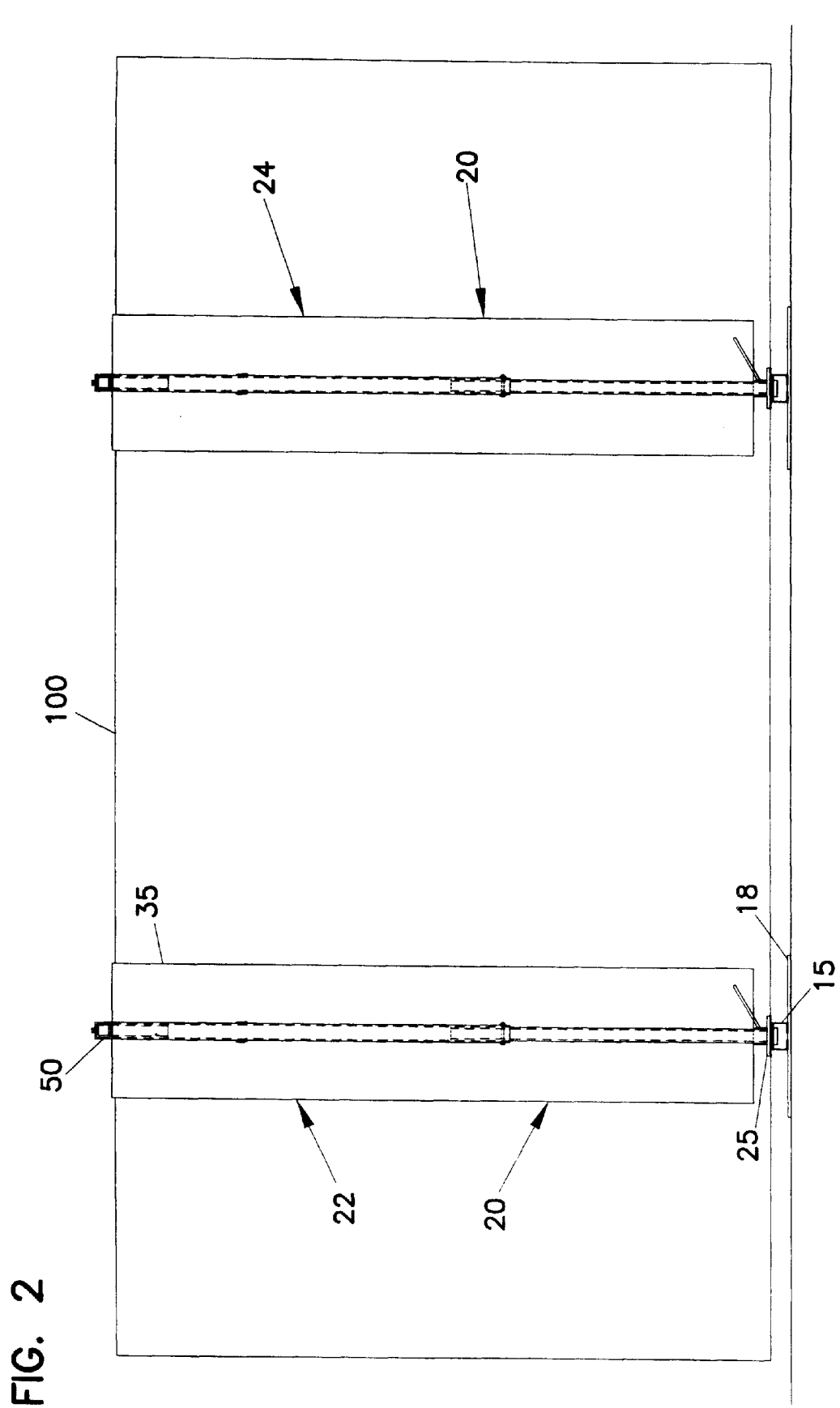
FIG. 2 is a side view of the carrier system of FIG. 1 having a plurality of sheets of building material held therein.

The view of FIG. 1 shows a first pair of opposed bracket assemblies 20, specifically first bracket assembly 21 and second bracket assembly 22, with a load of material 100 held therebetween. The view of FIG. 2 shows one side of load material 100, with second bracket assembly 22 from the first pair of opposed bracket assemblies, and fourth bracket assembly 24, which is from a second pair of opposed bracket assemblies.

Each bracket assembly 20 of carrier system 10 is supported by and mounted on a transverse lower rail 15, as seen in FIG. 1. One transverse lower rail 15 can be used for a pair of opposed support bracket assemblies 20; that is, first and second bracket assemblies 21, 22 can share a single transverse lower rail 15, or, each of first and second bracket assemblies 21, 22 can have its own transverse lower rail 15. If a single transverse lower rail 15 is used, the two bracket assemblies 21, 22 will be axially aligned or opposed, and the load 100 will be positioned over rail 15; if two transverse lower rails 15 are used, one for each bracket assembly 20, the two bracket assemblies 21, 22 may not be axially aligned or opposed, and the load 100 may or may not be positioned over the two rails 15. Load 100 is positioned between and supported by first and second bracket assemblies 21, 22.

Transverse lower rail 15 is positioned on, and optionally secured to, the surface of the vehicle in or on which the carrier system 10 is disposed. For example, if the carrier system 10 is positioned in the bed of a pick-up truck, in most instances it will not be desired to drill holes, attach bolts, or provide other permanent securing means to the bed; in these situations, transverse lower rail 15 is placed on the bed surface, probably wedged between the sidewalls of the bed. In some pick-up trucks, the interior side walls have integral notches designed to receive a member, such as a 2×4 lumber piece, in extension across the width of the bed. Transverse lower rail 15 can be configured to fit within such notches. As another example, if the carrier system 10 is positioned on a flat trailer with a wooden surface, transverse lower rail 15 can be easily secured to the wooden surface with screws or bolts. In the embodiment shown in FIGS. 1 and 2, carrier assembly 10 includes feet 18 affixed to transverse lower rail 15; feet 18 can be a structure, such as a planar piece with an area increased over that of transverse lower rail 15, to facilitate securing carrier system 100 to the surface. Further, the increased area of feet 18 can stabilize the carrier system 10 and reduce or minimize tipping.

Positioned on transverse lower rail 15 are the bracket assemblies 20. Each bracket assembly 20 has a sill member 25 and a retaining member 30. A bracing member 40 can be used to strengthen or shore-up retaining member 30. Bracket assembly 20 is preferably longitudinally adjustable along at least a portion of transverse lower rail 15, although in some embodiments, it may be desired to have bracket assembly 20 permanently affixed to transverse lower rail 15.

Sill member 25 is positioned in respect to transverse lower rail 15. Sill member 25 preferably is longitudinally adjustable along at least a portion of the length of transverse lower rail 15. Typically, sill member 25 is positioned on top of transverse lower rail 15, that is, on the side opposite the surface on which transverse lower rail 15 resides. In one embodiment, sill member 15 is a metal plate which rests on and extends along the top edge of transverse lower rail 15. In another embodiment, sill member 15 is a "c" shaped member which extends along the top edge, and at least partially along the two side edges of transverse lower rail 15; such a shape is often referred to as a "cap". In yet another embodiment, sill member 15 can extend along a side edge of transverse lower rail 15 rather than resting on top of rail 15.

Retaining member 30 is attached to sill member 25 and provides a surface which contacts the load of material or goods being held by carrier system 10; it is retaining member 30 that supports and stabilizes any large sheets of material in carrier system 10. Preferably, retaining member 30 is positioned vertically, which will generally be at a 90 degree angle to sill member 25. In some embodiments, however, it may be desired to position retaining member 30 at an angle other than vertical; for example, 15 degrees from vertical.

In embodiments where retaining member 30, for example first retaining member 31 of first bracket assembly 21, is angled from vertical, the retaining member 30 of the opposed bracket assembly 20, that is, second retaining member 32 of second bracket assembly 22, can be positioned parallel to first retaining member 31 or can be positioned at any angle to first retaining member 31. In some embodiments, for example, when storing or moving pipes or tubing, it may be desired to arrange first and second retaining members 31, 32 in the form of a "v".

The length of retaining member 30, that is, the distance that retaining member extends from either sill member 25 or transverse lower rail 15 can be any length that will securely or sufficiently retain a load of materials 100. Retaining member 30 should extend at least 50% of the height of any 100 being carried by carrier system 10, preferably at least 75% of the load height, and most preferably retaining member 30 should extend essentially the entire height of the load 100. For example, if 4×8 sheets of plywood are loaded, retaining member 30 is at least two feet high, preferably at least 3 feet high, and most preferably at least 4 feet high. In some embodiments, it may be desired to have retaining member 30 higher than the load of materials. Retaining member 30 can be expandable, to compensate carrying loads 100 having varying sizes.

In some embodiments, the surface of retaining member that contacts the load 100 secured by carrier system 10 may be increased; an increased surface area can be preferred when carrying easily damaged loads, such as sheets of polystyrene insulation or other soft or easily crushable or deformable material. An element with an enlarged surface area, such as expander 35, can be attached to retaining member 30 to minimize the chance of crushing areas of the load 100. Expander 35 is best seen in FIG. 2.

No matter what length, width or how oriented, retaining member 30 can be supported, reinforced or otherwise braced by a feature such as brace member 40. Brace member 40 extends from retaining member 30 to sill member 25, thereby forming a triangular structure. Brace member 40 can be expandable, to allow for extension of retaining member 30, or for any other reasons. Preferably, brace member 40 extends from a point close to the end of retaining member 30 and a point close to the end of sill member 25, although it is understood that brace member 40 can extend from any point on retaining member 30 or on sill member 25.

The various elements that form bracket assembly 20 (that is, sill member 25, retaining member 30 and optional brace member 40) can be secured together in any permanent or temporary method. The elements can be screwed, glued, bolted, nailed, welded, soldered, or otherwise connected together. If the temporary connections are used, the various elements of brace 30 can be disassembled and reassembled, for example, for replacing or repairing members. In a preferred embodiment, the connection points are pivotable.

Pivotable connection points, such as shown in FIGS. 1 and 7, allow bracket assembly 20 to be pivoted to an "open" position (such as in FIG. 7). Pivoting the bracket assembly 21 facilitates loading of materials 100 into carrier system 10. First retaining member 31 is connected to first brace member 41 at hinge 62 and to sill member 25 at hinge 66, and first brace member 41 is connected to sill member 25 at hinge 64. To allow bracket assembly 21 of FIG. 7 to properly pivot on hinges 62, 64, 66, at least one of the members (i.e., sill member 25, first retaining member 31, first brace member 41) must either expand or contract in length. In the embodiment shown in FIG. 7, brace member 41 is expandable and retractable in length, as needed, to allow bracket assembly 21, specifically retaining member 31, to be moved away from a vertical position.

The various elements of carrier system 10 can be made from various materials and have various constructions and shapes; it is not necessary that all of the elements are made from the same material. Examples of materials that can be used for various elements of carrier system 10 include wood, metal, plastic, and the like, as desired for the intended application. Reinforced plastic, fiberglass, lumber (in particular 2×4s or 2×6s) or other materials can be used for any or all of the various elements; such materials are light weight and are easily portable. Metals, such as steel (both cold rolled and hot rolled), iron, and aluminum also can used, particularly when high strength materials are desired. In one specific embodiment, each of sill member 25, retaining member 30, and bracing member 40 are made from lumber, such as 2×4s.

The various elements of carrier system 10 can have any shape or size. For example, FIGS. 3 and 4 show transverse lower rail 15 and feet 18 attached thereto. In this embodiment, transverse lower rail 15 is a pair of two "c" or channel rails spaced apart from one another with the open ends facing toward each other, leaving an opening at each the top and bottom at feet 18; in a variation of this, transverse lower rail 15 can be a single channel-type bar mounted on feet 18 with its one open side positioned away from feet 18. Another particular embodiment of a transverse lower rail 15 is a hollow, square rod with apertures therethrough; pins can be passed through the apertures to secure a sill member 25 to such a lower rail 15. Yet another particular embodiment of a transverse lower rail 15 is a solid rail, round, square, or rectangular having detents or notches therein into which a catch on a sill member 25 can be placed.

At least one bracket assembly 20 is movable and adjustably affixed to transverse lower rail 15. If a pair of opposed bracket assemblies 20 used, such as first and second bracket assemblies 21, 22, at least one of first bracket assembly 21 and second bracket assembly 22 is removably affixed to transverse lower rail 15. The other bracket assembly may also be removably affixed or may be permanently affixed. In some embodiments, both bracket assemblies 21, 22 are permanently affixed to transverse lower rail 15, but this limits the width of the load 100 that can be carried thereby.

Typically, sill member 25 is the element of bracket assembly 20 affixed, attached, clamped, coupled, hooked, locked, or otherwise fastened to transverse lower rail 15; a combination of two or more various fastening systems may be used. This may be done by any system or mechanism. For example, a bolt, spike, rod, screw, pin or the like can be vertically inserted through sill member 25 into transverse lower rail 15. In another embodiment, a bolt, spike, pin, or the like can be horizontally inserted through a side edge of sill member 25 and transverse lower rail (for example, if sill member 25 is "c" shaped or a channel). A preferred embodiment for securing sill member 25 to transverse lower rail 15 is shown in FIG. 5.

In FIG. 5, transverse lower rail 15 is a pair of "c" rails, such as shown in FIG. 4, mounted on feet 18. Sill member 25 is secured to transverse lower rail 15 by a fastening system 29 that includes a base plate 92 to which is permanently welded or otherwise affixed a threaded member 95. This base plate 92 is positioned within transverse lower rail 15; the width of base plate 92 is greater than any gap between the "c" rails of transverse lower rail 15, thus base plate 92 cannot be pulled up and out from transverse lower rail 15, nor can base plate 92 twist or torque, even if not tightened. To threaded member 92 is attached a nut 96. Nut 96 can be tightened and loosened, for example, by a crescent wrench or by a handle integral with nut 96. A metal or rubber washer can be positioned between nut 96 and sill member 25.

Fastening system 29, if used with a transverse lower rail 15 as of FIGS. 3, 4 and 5, can be moved and secured along the length of rail 15. Alternately, a transverse lower rail 15, having a plurality of holes, passages or the like in the top, can be used so that bracket assembly 20 can be incrementally adjusted along at least a portion of the length of rail 15.

The carrier system 10 can include a securement system 50 for attaching retaining members 30, in particular first retaining member 31 and second retaining member 32, at a fixed distance. In FIG. 1, first and second bracket assemblies 21, 22 are fixedly on either side of a load of material 100 by securement system 50. In another embodiment, securement system 50 can hold a load securely at a fixed distance to a single retaining member 30; in FIG. 7, a partial load of material is secured by securement system 50 to second bracket assembly 22.

Referring now to FIGS. 1, 6 and 7, particularly FIGS. 1 and 6, in most embodiments securement system 50 is fixedly attached to each of first retaining member 31 and second retaining member 32 by retaining inserts 51, 52, respectively, which are configured to engage with retaining members 31, 32; retaining inserts 51, 52 are detachable from, and preferably removable from, retaining members 31, 32. In the embodiment shown in FIGS. 1 and 6, retaining inserts 51, 52 are configured to extend at least partially into receiving holes in retaining members 30; other attachment systems, such as screws, bolts, pins and the like can alternately or additionally be used to secure retaining inserts 51, 52 into retaining members 31, 32.

A pivotal expansion bar 55, extending between retaining inserts 51, 52, when secured, maintains a fixed distance between inserts 51, 52. In the embodiment shown, expansion bar 55 is connected to first retaining insert 51, but is slideably moveable in respect to second retaining insert 52 at guide 54. Bar 55 slides within guide 54 to adjust the distance between first and second inserts 51, 52. Further, expansion bar 55 is pivotal in relation to second insert 52 at guide 54. Once adjusted to the desired length, expansion bar 55 is locked in, for example, by a pin, screw, or the like. To secure a load 100 already loaded between first and second bracket assemblies 21, 22, both retaining members 30 are positioned vertically, second retaining insert 52 is attached to, such as placed within, second retaining member 32 (if not already so), and first retaining insert 51 is attached, such as placed within, first retaining member 31. Once adjusted to the desired length to minimize any shift of the load 100, pivotal bar 55 is locked into place.

An alternate use for securement system 50 is shown in FIG. 7. Securement system 50, with second retaining insert 52 mounted to second retaining member 32, is used to secure load 100 to second bracket assembly 22. Such a use for securement system 50 is optimal for securing a partial load, or for holding a load in a stationary position.

Securement system 50 can be made from the same or different materials as carrier system 10. The various parts of securement system can be shaped and sized in any configuration with interact with carrier system 10.

A Preferred Embodiment

In one preferred embodiment, a carrier system 10 includes four bracket assemblies 20 positioned as two pairs of opposed bracket assemblies 20. Each pair of opposed bracket assemblies 20 is mounted on a transverse lower rail 15. Each of the bracket assemblies 20 includes a sill member 25, retaining member 30, and a brace member 40.

Transverse lower rail 15 is as shown in FIGS. 3 and 4, made from two channel irons, each 3 inches by 58 inches long, with 1¼ inch legs. A ½ inch gap is between the two channel irons. The transverse lower rail 15 is welded to two feet 18, each foot being 3 inches by 12 inches and 3/16 inch thick, and positioned 14½ inches from each end of rail 15. A ½ inch hole is drilled into the center of each foot to facilitate attachment of the carrier system 10 to the transport surface.

In particular, sill member 25 is a hot rolled steel, 3/16 inch thick, 3 inches wide and 15 inches long; a ½ inch hole is provided at the center of the sill member 25 and extends therethrough. At each end of sill member 25, a 1 inch square "t"-bar extends from and is permanently attached to sill member 25; the "t"-bar is configured to pass between the two channel irons of transverse lower rail 15. The "t"-bars eliminate twisting and swiveling of sill member 25. The central ½ inch hole accepts a ½ inch threaded bolt that is attached to a fastener assembly 29, such as shown in FIG. 5.

The retaining member 30 is a square, 1¼ inch per side, 12 gauge, 48 inch long tubing. Four holes are provided along its length for attachment of an expander 35 (a 6 inch by 48 inch ½ thick plywood piece). On the side opposite expander 35, two parallel legs (each 3/16 inch by 1 inch by 1 inch) are welded to the retaining member 30.

Bracing member 40 attached to retaining member 30, consists of two 24 inch pieces one being 1¼ inch square 12 gauge tubing, and the other 1 inch square 12 gauge tubing. A ⅜ inch hole is in one end of each of the pieces. The 1 inch tubing fits within the 1¼ tubing; a ⅜ inch bolt passes through both pieces where they overlap. To change the length of bracing member 40, the bolt is removed and the two pieces can be readjusted to create a different length. A nut can be placed on the bolt.

The carrier system 10 of the present invention can be adapted to hold various types of materials, such as sheet goods (plywood, drywall, polystyrene insulation, and the like), lumber, pipes and tubing, windows, doors, rolls of carpet, and any other material. For some materials, it may be desired to secure the load with one pair of opposed bracket assemblies 20 (for example, for a single window, to minimize any twisting or torquing), with two pairs of opposed bracket assemblies 20, or with a single bracket assembly 20. As stated above, if a single transverse lower rail 15 is used for a pair of opposed bracket assemblies 20, the load 100 will rest on rail 15. In some embodiments this may be undesirable, for example, if load 100 is easily damaged; the weight of the load material on a small area can damage the material. It may be desirable to provide a pad, lift, or other spacer under load 100 to more evenly distribute the weight of the load 100. Such a spacer can be wood, foam, plastic, carpeting, or the like.

It should be understood that any configuration and orientation of bracket assemblies 20 according to the present disclosure can be used to provide a carrier system 10 according to the present invention.

Method of Loading Materials in the Carrier System

Prior to loading sheet goods or other materials into the carrier system 10, it is preferable to know approximately how many and of what type of material is to be loaded, so that the load 100 can be approximately centered along transverse lower rail 15. One half of the overall thickness of the load 100, when stacked tightly together, should be calculated. A bracket assembly 20, such as second bracket assembly 22, should be positioned on transverse lower rail 15 approximately the afore-calculated distance from the mid-point of the rail 15. In some embodiments, the placement of the load 100 may be farther to one end of rail 15 rather than being centered. Second bracket assembly 22 should be tightly secured to transverse lower rail 15 prior to loading any materials. The materials can now be loaded.

The pivoting characteristic of the bracket assemblies 20 allows any larger loading machines, such as flat-bed trucks, fork-lifts or fork-trucks, to closely approach the carrier system 10 and directly place the materials onto carrier system 10; it may be desired to manually load the materials onto the carrier system 10 from the loading vehicle.

If sheets of different types of material that are greatly different in weight or density are to be loaded, for example drywall or plywood and polystyrene insulation, it may be desired to load the heavier materials first against the secured second bracket assembly 22. For example, if six sheets of drywall and six sheets of insulation are to be loaded, it may be desired to load the drywall first. It should be noted that the overall carrier system 10 should be shifted to the side of the load that is lighter, in order to essentially equalize the weight distribution laterally across the transport vehicle.

If the carrier system 10 is positioned on a trailer, it may be desired to position the carrier system 10 and the load 100 so that the center of mass is closer to the trailer hitch than the rear of the trailer; this will minimize the chance of the trailer "fishtailing" while being moved.

Additionally, if the vehicle on which the carrier system 10 is positioned, such as a trailer or pick-up, is sitting off level, it is preferred to place the second bracket assembly 22 on the lower side and begin loading against second retaining member 32.

The sheet goods or material should be placed tightly against second retaining member 32 of second bracket assembly 22. The bottom of a first sheet of material is placed flush with second retaining member 32, after which the top of the sheet is placed against the retaining member 32. If desired, securement system 50 can be adjusted to retain the sheet against second bracket assembly 22 by hooking first retaining insert 51 against the sheet. Other clamps, including "F"-clamps, hooks, or other securement means can also be used. As each subsequent sheet of material is loaded, the securement system 50 can be adjusted to hold the sheets.

In certain vehicles, such as flat bed trailers and shorter pick-up truck beds, it may be desired to provide an extra level of security to insure that load 100 does not slide out from carrier system 10. For example in a pick-up truck, a mesh gate, net, rope, or the like, can be stretched across the opening to catch any part of load 100 that may slide.

At the final destination, the load 100 can be removed or unloaded from carrier system 10 in generally the reverse step sequence.

The above specification and examples are believed to provide a complete description of the manufacture and use of particular embodiments of the invention. Many embodiments of the invention can be made.

What is claimed:

1. A carrier system comprising:

(a) a first rail; and (b) a bracket assembly moveably attached to the first rail, the bracket assembly comprising:

(i) a sill member constructed and adapted for releasable engagement with the first rail;

(ii) a retaining member pivotally hinged to the sill member; and (iii) a brace member connecting the sill member and the retaining member.

2. The carrier system according to claim 1, wherein:

(a) the sill member has a first end and a second opposite end;

(b) the retaining member is pivotally hinged to the first end of the sill member; and (c) the brace member is pivotally hinged to the second end of the sill member.

3. The carrier system according to claim 2, wherein:

(a) the brace member has an adjustable length.

4. The carrier system according to claim 1, further comprising a second bracket assembly moveably attached to a second rail, the second bracket assembly comprising:

(a) a second sill member constructed and adapted for releasable engagement with the second rail;

(b) a second retaining member pivotally hinged to the second sill member; and (c) a second brace member connecting the second sill member and the second retaining member.

5. The carrier system according to claim 4, further comprising:

(a) a securement system comprising:

(i) a first insert for removable connection with the first retaining member;

(ii) a second insert for connection with the second retaining member; and (iii) an expansion bar extending from the first insert to the second insert, the expansion bar having a length adjustable between the first insert and the second insert, and the expansion bar being pivotal in relation to the second insert.

6. The carrier system according to claim 4, wherein:

(a) the first rail comprises a first channel iron; and (b) the second rail comprises a second channel iron.

7. The carrier system according to claim 6, wherein:

(a) the first rail includes a first stabilizing foot; and (b) the second rail includes a second stabilizing foot.

8. The carrier system according to claim 4, wherein:

(a) the second rail is a continuous extension of the first rail.

9. A carrier system comprising:

(a) a first rail and a second rail, the second rail being parallel to the first rail;

(b) a first bracket assembly, a second bracket assembly, a third bracket assembly, and a fourth bracket assembly, each of the bracket assemblies comprising:

(i) a sill member constructed and adapted for releasable engagement with one of the first rail and the second rail;

(ii) a retaining member pivotally hinged to the sill member; and (iii) a brace member connecting the sill member and the retaining member;

(c) the first bracket assembly and the second bracket assembly mounted on the first rail, and the third bracket assembly and the fourth bracket assembly mounted on the second rail; the first bracket assembly and the third bracket assembly being moveably mounted.

10. The carrier system according to claim 9, wherein:

(a) each of the sill member of the first bracket assembly and the sill member of the third bracket assembly has a first end and a second opposite end;

(b) each of the retaining member of the first bracket assembly and the retaining member of the third bracket assembly is pivotally hinged to the first end of the respective sill member; and (c) each of the brace member of the first bracket assembly and the brace member of the third bracket assembly being:

(i) pivotally hinged to the second end of the respective sill member; and (ii) adjustable in length.

11. The carrier system according to claim 10, further comprising:

(a) a securing system comprising a first securing device and a second securing device, each securing device comprising:

(i) a first insert for removable connection with the retaining member of one of the first bracket assembly and the third bracket assembly;

(ii) a second insert for connection with the retaining member of one of the second bracket assembly and the fourth bracket assembly; and (iii) an expansion bar extending from the first insert to the second insert, the expansion bar having a length adjustable between the first insert and the second insert, and the expansion bar being pivotal in relation to the second insert.

* * * * *